United States Patent
Tanner et al.

[11] 3,860,728
[45] Jan. 14, 1975

[54] CARAMEL-CONTAINING COLLAGEN SAUSAGE CASING AND SMOKED SAUSAGE

[75] Inventors: Alistair Gilmour Tanner, Milngavie; James Tarleton Wallace, Glasgow, both of Scotland

[73] Assignee: Devro, Inc., Somerville, N.J.

[22] Filed: Apr. 5, 1973

[21] Appl. No.: 348,375

[52] U.S. Cl. ............................... 426/105, 426/140
[51] Int. Cl. ..................... A22c 11/00, A22c 13/00
[58] Field of Search ............ 426/105, 138, 140, 250, 426/277, 92, 177, 212, 262

[56] References Cited
UNITED STATES PATENTS

| | | | |
|---|---|---|---|
| 3,123,482 | 3/1964 | Lieberman | 426/140 |
| 3,235,641 | 2/1966 | McKnight | 426/277 |
| 3,274,005 | 9/1966 | Alsys | 426/140 |

FOREIGN PATENTS OR APPLICATIONS

| | | | |
|---|---|---|---|
| 713,510 | 7/1965 | Canada | 426/140 |

*Primary Examiner*—Hyman Lord

[57] ABSTRACT

Edible extruded collagen sausage casings containing caramel are manufactured from a fluid mass of swollen collagen to which caramel has been added prior to extrusion, said casings having improved properties when stuffed with meat emulsion to form sausages which are then smoked, in that upon being canned or cooked in hot water, the pigtail ends of the smoked sausage links self-adhere and do not untwist but tend to remain closed, and the tendency to gelatinize of nonsmoked areas of the casing is reduced.

10 Claims, 5 Drawing Figures

PATENTED JAN 14 1975  3,860,728

CARAMEL-CONTAINING COLLAGEN SAUSAGE CASING AND SMOKED SAUSAGE

This invention relates to an improved collagen sausage casing which has improved properties for use in smoked sausages (e.g., better self-adhesion at the pigtail end of a smoked sausage made with said casing) and to a method of producing such casings and more particularly to an extruded collagen casing containing caramel and to a method of producing such casing from a fluid mass of swollen collagen containing caramel and to a smoked sausage made with a caramel-containing collagen casing.

Collagen sausage casings are well known, and such casings and various methods for their manufacture have been described in various patents including Lieberman U.S. Pat. No. 3,123,653; Fagan U.S. Pat. No. 3,535,125; Braun U.S. Pat. No. 2,852,812; and Cohly et al. U.S. Pat. No. 3,627,542; and many others assigned to the assignees of the foregoing patents.

Collagen casings have supplanted natural casings in the business operations of many sausage manufacturers. However, the sausage industry emcompasses a great variety of products made with a great variety of meat emulsions processed in a great variety of methods designed to prepare products which are cooked in various ways for ultimate consumption. Thus it is not surprising that collagen casing considered eminently satisfactory for use to make one type of sausage may not be considered quite as satisfactory for other types of sausages. One of the more demanding types of sausages as far as the collagen casing is concerned is a sausage of the wiener or frankfurter type which is intended to be smoked and which may then be canned by autoclaving or else, if not canned, which is prepared for eating in the home by being heated in hot water.

Attempts have been made to develop improved collagen casings for use with sausage of the wiener or frankfurter type. McKnight U.S. Pat. Nos. 3,151,990 and 3,235,641 are examples of such improved collagen casings, which are edible sugar-treated and heat cured casings. These are made by extruding a fluid mass of swollen collagen to form a tubular body, hardening the tubular body, applying a solution containing a reducing sugar and heat curing the resultant casing. The edible sugar-treated and heat cured casings so made are indeed superior in many respects to previous collagen casings for use with sausages of the wiener or frankfurter type. However, there still is room for improvement, particularly in certain applications, i.e., those involving certain smoked sausage products which are heated in hot water just prior to being eaten. It has been found that when such smoked sausage are cooked in hot water, the pigtail ends of such sausages, especially those which have been filled and twisted on a Handtmann linking machine, tend to untwist and come slightly open instead of the pigtail ends of the sausages self-adhering and remaining closed. This opening of the ends of the sausage links, which is sometimes called "fishmouthing," presents a poor appearance to consumers, especially since sausages made with natural casing have ends which tend to remain closed.

A second serious problem with smoked sausage is that when the links of sausages are hung on smoke sticks during the gaseous smoking operation as they customarily are, those portions of the casing of those sausages which are in contact with the sides of the smoke stick or which are in contact with other sausages do not become smoked at the points of contact. As a result, there are nonsmoked areas of the collagen sausage casing. When the smoked sausage is subsequently processed and cooked in hot water, the nonsmoked areas became weakened areas where the collagen casing appears to have gelatinized, i.e., it is soft, whitish in appearance and seems more like a yielding geltinous mass which soon breaks if rubbed with a finger as well as presenting an unappetizing appearance to the housewife.

Both of these problems also occur with smoked sausages that are canned by an autoclaving process.

Many unsuccessful attempts have been made to overcome these problems. However, now by means of the present invention, it has been unexpectedly found that a superior collagen casing finally can be made so that the twisted ends of smoked sausages made with such casing self-adhere and do not come open at all or only slightly when placed in hot water for subsequent cooking by the housewife or when canned by autoclaving. Also the casing of the present invention has been unexpectedly found to increase the hydrothermal stability of collagen casing in hot water and thereby to reduce greatly the tendency for the nonsmoked area to become gelatinous on hot water blanching or autoclaving.

Another advantage of the caramel-containing casing of the present invention is that casing performance now is less dependent on the particular smoking process being used so that more uniform results are obtained even with variations in smokehouse operation that occur among the various smoked sausage manufacturers.

The present invention involves an edible collagen casing containing caramel, which casing may either be uncured or heat cured depending on the intended end use. Best results are obtained with the noncanned smoked sausage when an uncured casing is used while a heat cured casing works best for the canned smoked sausage.

The exact theoretical reason why caramel, which is a high molecular weight substance which would be expected to be relatively inert with respect to any interaction with collagen, is successful in overcoming the above problems is unknown, but the caramel in the casing does react with the collagen in the casing when heated in the course of the normal drying step and subsequent cooking steps forming a strongly bound complex from which the caramel is not easily detached from the collagen. This new product is possibly responsible for the improvements obtained discussed above.

In producing the caramel-containing casings of the present invention, the caramel is introduced into the fluid mass of acid-swollen collagen prior to its extrusion into tubular form. Any other casing ingredients which are normally used may also be present, e.g., cellulose, if desired, and the caramel could be introduced together with the cellulose into the collagen mass. The caramel-containing mass of swollen collagen is then extruded in tubular form and hardened and treated in the normal manner (with the possible omission of the heat curing step where an uncured casing is desired) just as if no caramel were present, for example, in the manner shown in the previously mentioned patents. Where heat cured casing is desired, a wide range of temperature and time heat curing conditions is possible, but the preferred heat cure is obtained by heating the casings from ambient temperature up to 85°C over 12 hours and holding it at 85°C for an additional 3 hours, preferably after the casing has been shirred. Incorporating caramel into the fluid mass of acid-swollen collagen (preferably a mass of hide collagen fibrils swollen with lactic or hydrochloric acid) results in the caramel being distributed substantially uniformly throughout the casing although some of the caramel on the surface could leach out in the washing steps.

Once the caramel-containing casing has been prepared, all further steps involved until the smoked sausage made with it has been produced are conventional.

Caramel is a well-known material used in many industries as a natural coloring and is manufactured by many companies. Usually it is an amorphous dark brown material resulting from the controlled heat treatment of various carbohydrates including dextrose, invert sugar, lactose, malt syrup, molasses, starch hydrolysates, sucrose, etc. Often a small amount of alkali, alkaline carbonate and other salts, or a trace of mineral acid is added while heating to assist caramelization. There are various grades and varieties of caramels, some available in powdered form but most of which are available as viscous liquids. All caramels are usable in the present invention. Various caramels can be distinguished from each other by their isoelectric points. At pH's above the isoelectric point, the caramel is negatively charged while at pH's below the isoelectric point, the caramel is positively charged. For purposes of the present invention, it is preferred to use caramel with low isoelectric points at a pH of approximately 2.0 or less, which are acid caramels. Neutral or ammoniated caramels, which have higher isoelectric points, work but tend to leach out more in the process than do the preferred acid caramels. Also the various grades of caramel differ as to their molecular weights, and while all are usable, high molecular weight grades are preferred in the present invention. For convenience, all references herein to amounts of caramel will refer to the amount of caramel solids present in whatever caramel is used. For example, caramels in liquid form may have different solids contents (one of the ones preferred is 53 percent solids) so it is easy to calculate what amount of any particular caramel is equivalent to any other caramel.

To illustrate and list some of the preferred caramels for use in the present invention, of the various grades of caramels obtained commercially in Great Britain, especially satisfying results were obtained with Grades T4 and T5, which are acid caramels made from glucose, while slightly less satisfying results were obtained with Grades T13, which is an ammoniated caramel made from corn syrup, and T31, which is a powdered form of the ammoniated caramel made from corn syrup.

The amount of caramel present in the casings of the present invention may range from 1 to 10 percent by weight of the total casing weight. The preferred range for uncured casing is 4 to 8 percent, and the optimum is 6 to 8 percent while the preferred range for heat cured casing is 1–3 percent, and the optimum amount is 1.5–2 percent.

In practice, the caramel to be used will normally be calculated as a percentage of the weight of dry collagen solids present in the fluid mass of gel which is to be extruded. Thus where a gel is desired having a 4 percent collagen solids content, 0.6 percent caramel (which is 15 percent of the collagen solids) would be added, and this would result in about 8 percent caramel in the finished casing where there is no loss of caramel during manufacture. The actual loss will depend on the particular caramel grade used and on the processing steps used since some leaching can occur during the washing steps.

It will be seen that the present caramel collagen casing invention has broad applicability since it is believed the caramel can be incorporated successfully in all prior art collagen sausage casings whether fibrillar or fibrous in nature and whether the collagen is obtained from fresh hides, limed, or unlimed (delimed) hides, salted hides, and whether the tubular casing after extrusion is coagulated in baths such as ammonium sulfate, sodium sulfate, etc., or in ammonia gas or otherwise, and no matter what further hardening or tanning steps are used and what plasticizing baths are used.

The caramel-containing collagen sausage casings of the present invention are handled in conventional manner to make sausage and especially smoked sausages. Thus the casing, preferably in shirred form, is stuffed with a meat emulsion, and the stuffed casing is then formed into sausage links. Normally this is accomplished on automatic or semi-automatic high speed, commerically-available equipment. The sausage links, usually in the form of a string of links, can then be smoked in conventional smokehouse equipment, preferably in a modern smokehouse equipped with steam, dry heat, and air conditioning and cold water shower. The resultant smoked sausages are then made available to the customer for preparation in any desired manner. Also some smoked sausages may be canned using an autoclaving process.

The present invention may be more fully understood from the following detailed description and examples, which are intended only as exemplary of the preferred embodiments and explanatory and not as restricting the invention thereto, taken in connection with the accompanying drawings, wherein:

FIG. 1 illustrates the caramel-containing collagen casing 11 which has been shirred and is partly unshirred at each end.

FIG. 2 is a schematic view showing the filling of the casing 11 with sausage emulsion on an extrusion horn or nozzle 13 and the preparation of a chain of sausage links 15 formed by twists 17 of the emulsion filled casing.

Figure 1:
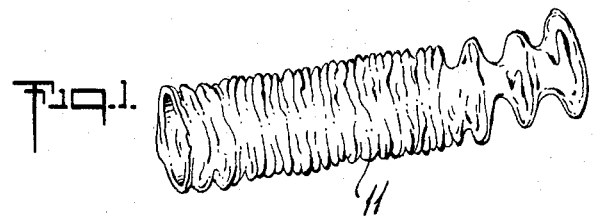
Figure 2:
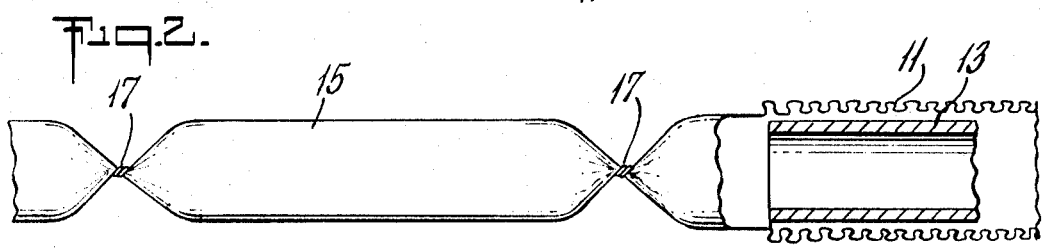
Figure 3:
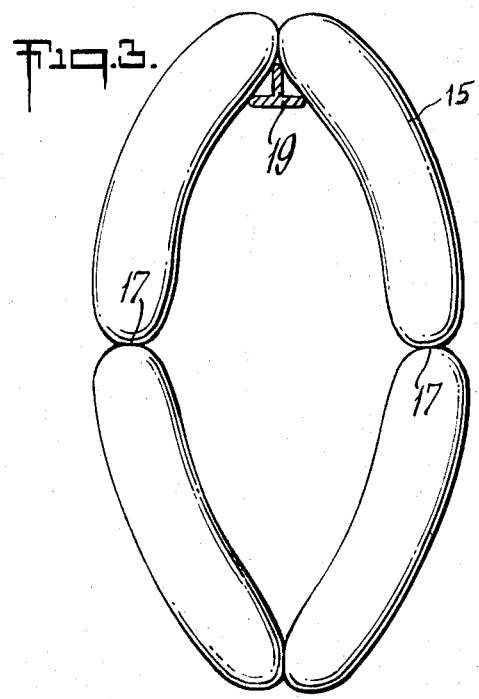
FIG. 3 illustrates the sausage links 15 hanging two up, two down, on a T-bar type smoke stick 19 and how the sausages contact the smoke stick or each other at various points.
Figure 5:
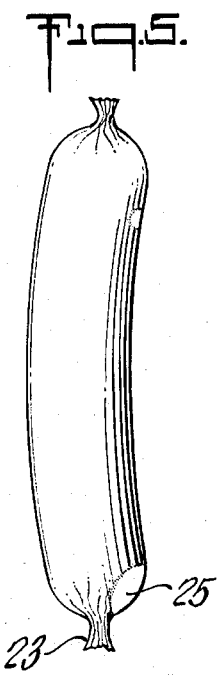
FIG. 5 illustrates a single link of prior art type cooked smoked sausage made with a noncaramel-containing casing, having untwisted pigtail ends 23 and a nonsmoked area 25 which has gelatinized.
Figure 4:
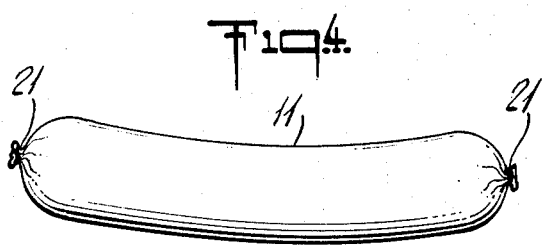
FIG. 4 illustrates a single link of cooked smoked sausage made with caramel-containing casing after separation from the other links in the chain and the desired closed pigtail ends 21 closed.

Throughout the specification and examples, all quantities are expressed in parts by weight unless otherwise indicated.

EXAMPLE 1,

HIDE PREPARATION — UNLIMED HIDES

Steer hides from freshly slaughtered animals are trimmed and sided. They are washed and soaked overnight in city water at 60°F. The following day they are fleshed and weighed.

To a paddle vat with a capacity of 4,160 liters is added 2,890 kg. of water and 1,270 kg. of the fleshed hide. Fourty-four kg. (3.5 percent) of hydrated lime, 26.8 kg. (2.1 percent) of sodium sulfhydrate and 11.1 kg. (0.875 percent) of sodium sulfide are added to the vat and the paddle is run for one hour and stopped for 1 hour. The paddle is then run for 5 minutes out of every 3 hours. At the end of 24 hours, the vat is drained, and the hides are washed in city water (60°F) for 15 minutes, pulled, and lime fleshed. The fleshed hides are returned to the paddle vat and washed clean with well water at 60°F. The washed hides are then slit on a leather slitting machine, and the corium layer is further processed to prepare the collagen for extrusion.

A large wooden drum (capacity 5,460 liters) is charged with 527 kg. of hide corium prepared as described above. The hide is washed in the drum for 9½ hours at a flow rate of 13 liters per minute. The wash water is drained from the hide corium, and the washed corium is treated in the drum with 1,315 liters of water containing 3.8 kg. of anhydrous citric acid and 3.0 kg. of sodium citrate dihydrate. The drum is rotated for 8 hours, at the end of which time the citrate solution is drained, and the hides are washed for 2 hours in running water.

The hide corium is drummed a second time for 8 hours with a solution containing 3.8 kg. of anhydrous citric acid and 3.0 kg. sodium citrate dihydrate in 1,315 liters of water and finally washed with water for 8½ hours in the drum. The hide is shredded and ground to a particle size approximately 5 mm.

EXAMPLE 2

PREPARATION OF EXTRUSION MASS

A mixture of 47 kg. (14.2 kg. dry hide solids) of the 5 mm. ground hide particles prepared as described in Example 1 above and 153 liters of water at 14°C is passed through a high speed cutting mill wherein the hide particles are shredded with rapidly rotating knives to form a hydrated mass of fibrous character.

In a stainless steel tank, 2.84 kg. of cellulose fibers are thoroughly dispersed with 190 liters of water. To this cellulose dispersion is added 5.9 kg. of 88 percent lactic acid and 2.1 kg. of caramel liquid (obtained from Hay-Lambert Ltd. as Grade T-5 and which is an acid caramel made from glucose containing 53 percent caramel solids) with complete mixing. (The caramel solids used are 8 percent of the hide solids used, and the cellulose used is 20 percent of the hide solids.) The mass of fibrous hydrated collagen from the high speed cutting mill and the acid-caramel-cellulose-water mixture are pumped at equal flow rates through a common pipeline into a storage tank. Mixing of the collagen particles, the caramel, and the cellulose occurs as the two solutions move through the common pipeline with acid swelling of the collagen particles. After storage for a period of 18 to 24 hours, the mixture of caramel, cellulose, and acid-swollen collagen is further dispersed with a suitable homogenizer such as a Manton-Gaulin homogenizer (Model 125-K-5BS), fitted with a two stage valve and operated with a 1,500 p.s.i. drop per stage. The homogenized mixture is pumped to a storage tank and deaerated under vacuum. The extrusion mass or gel so obtained has the following composition:

|  | Percent |
|---|---|
| Hide solids | 3.55 |
| Hard wood cellulose | 0.71 |
| Lactic acid | 1.3 |
| Caramel | 0.28 |

EXAMPLE 3

EXTRUSION AND CASING FORMATION

The homogenized extrusion mass prepared as described in Example 2 above is pumped from the storage vessel through a filter and extruded through a disk extruder of the type illustrated in FIG. 1 of U.S. Pat. No. 3,122,788. Using the equipment of the type illustrated in FIGS. 1-6 of U.S. Pat. No. 3,535,125, the extruded tube of caramel-containing, acid-swollen collagen is inflated with air and ammonia gas which reacts with the acid present in the extrusion mass to form ammonium salts with de-swelling of the collagen and increase in the tensile strength of the tubing. The extruded tube is supported on a moving belt until it goes into the various water wash and plasticizer baths described and illustrated in Example VI of said U.S. Pat. No. 3,535,125. The extruder is cooled by circulation of fluid through the jacket at 9°C. The extruded collagen casing of cohered collagen fibrils, is inflated with air and anhydrous ammonia is metered to the interior of the casing at a rate of about 1.6 grams per minute and to the exterior enclosure surrounding the casing at a rate of 3.4 grams per minute. The diameter gauge is adjusted to control the diameter of the extruded casing at 26 ± 1 mm.

The extruded casing is flattened between the pinch rollers and falls from the end of belt into holding basket within the water wash tank. The casing is transferred through a series of compartments within the tank by the godets and is subjected to intimate contact with the wash water which circulates through the openings in the walls of each compartment. The total dwell time of the casing in the water wash tank is 35 minutes, and the flow rate of fresh wash water through the tank is 13 liters per minute.

The plasticizer composition within the plasticizer tank is an aqueous solution of 4.5 percent glycerin and 1.3 percent sodium carboxymethyl cellulose which circulates through the tank at a flow rate of 6 liters per minute. The total dwell time of the casing in the plasticizer tank is 7.5 minutes. Openings in the vertical walls of the compartments communicate with the plasticizing solution in the tank and assure intimate contact of the casing with the plasticizing bath.

The casing from the plasticizing bath is inflated with air and passed directly into a hot air dryer. As the casing leaves the dryer, it is shirred on the apparatus described and claimed in U.S. Pat. No. 3,315,300. The shirred caramel-containing casing (which is not later heat cured) had a final composition which is approximately:

|  | Percent |
|---|---|
| Collagen | 52.5 |
| Cellulose | 10.5 |
| Glycerin | 16 |
| Moisture | 16 |
| Caramel (solids) | 4 |
| Sodium Carboxymethylcellulose | 1 |

EXAMPLE 4

Extrusion and Casing Formation of Heat Cured Casing

Following the procedure of Examples 2 and 3 but using only 1.1 kg. of caramel liquid (Hay-Lambert Ltd. Grade T-5), i.e., the caramel solids used are 4 percent of the collagen hide solids used.

The resultant shirred caramel-containing casing had a final composition which is approximately:

|  | Percent |
| --- | --- |
| Collagen | 54.2 |
| Cellulose | 10.8 |
| Glycerin | 16 |
| Moisture | 16 |
| Caramel (solids) | 2 |
| Sodium Carboxymethylcellulose | 1 |

The shirred casing is then heat cured in a forced draft oven by heating from ambient temperature up to 85°C over 12 hours and holding it at 85°C for an additional 3 hours.

EXAMPLE 5

Non-Cellulose Casings

Following the procedures of Examples 1–4, but omitting the cellulose in Example 2 and using Hay-Lambert Ltd. Grade T-4 caramel, satisfactory caramel-containing uncured and heat cured casings are obtained.

EXAMPLE 6

Hydrochloric Acid Gel Casings

Following the procedures of Examples 1–5, but using an equivalent amount of hydrochloric acid in place of the lactic acid in Example 2, satisfactory caramel-containing casings are obtained.

EXAMPLE 7

Manufacture of Smoked Sausages

The emulsion used in the preparation of these sausages is a typical frankfurter or wiener mix, characteristically soft and wet. Such emulsions may or may not contain skimmed milk solids or phosphate and also may or may not contain added smoke flavor. The following standard recipe is conveniently used:

| Lean beef | 3.84 | kg. |
| --- | --- | --- |
| Pork cheeks (jowls) | 3.84 | kg. |
| Pork backfat | 3.0 | kg. |
| Ice/water | 2.50 | kg. |
| Salt | 0.25 | kg. |
| Nitrite (NaNO$_2$) | 1.8 | gms. |
| White pepper | 25 | gms. |
| Coriander | 2.5 | gms. |
| Nutmeg | 5.0 | gms. |
| Paprika | 5.0 | gms. |

The emulsion is prepared by the following steps using normally available meat industry equipment.

a. The chilled lean beef and pork jowls are salted and ground to 3 mm. grind size using a CRYPTO mincer, type AD 22.

b. The pork backfat is similarly ground but kept separate from the meat. (At this stage, the meat can be stored in a cool place overnight to allow color development.)

c. The ground meat is chopped up with the addition of some of the ice/water, using an ABR bowl cutter.

d. The ground, chopped meat is removed from the bowl cutter except for a small layer to which is added the ground backfat and the chopping repeated.

e. The spices and the rest of the salt are added to the backfat together with some of the ice/water.

f. The ground, chopped meat is returned to the bowl cutter, and the complete mixture chopped up together with addition of the remainder of the ice/water. Throughout the cutting operation in the bowl cutter, the temperature rise should not exceed 4°C so that the final temperature of the meat mix (emulsion) does not exceed 15°C.

g. The resultant mix is stuffed into caramel-containing collagen casings (made as in each of the preceding examples) of 21 mm. diameter using a Handtmann (ABR) twist-linker, type FA 40, to give sausages of weight 50 g., length 15 centimeters. In the same manner, sausages of other weights, e.g., 70 g. and 90 g. or any customary sausage sizes may be prepared, with the same results as for 50 g. samples.

h. Smoking can be carried out in any conventional smokehouse by the customary techniques involving gaseous smoke. The filled sausages made as described in (g) are hung one up, one down (or two up, two down) on aluminum T-sections and smoked with smoke from wood chips in a simple smokehouse at 75°C for 30–40 minutes after an initial prehumidification stage of about 20 minutes duration. The resultant smoked sausages are removed from the smokehouse and sprayed with cold water to minimize wrinkling of the casing on cooling.

i. The smoked sausages made with uncured casings are now ready for distribution to the housewife, in which event they are to be kept refrigerated until ready for use by the housewife. Sausages prepared in the above manner were cooked in hot water at 70°-80°C for a minimum of 10 minutes. Upon examination, these cooked smoked sausages have an excellent appearance with good pigtail effects and no "fishmouthing" since the twisted ends stayed closed. The parts of the sausages which had contacted the smoke stick or each other did not gelatinize and did not have a whitish appearance. The taste of the sausage was excellent.

j. The smoked sausages made with heat cured casings are now ready for autoclaving and canning in sealed metal cans by conventional means. The autoclaving used is 110° to 120°C for up to 20 minutes in a 3 percent brine. The canned smoked sausages have an excellent appearance with good pigtail effects and minimum gelatinization.

What is claimed is:

1. An edible caramel-containing hide collagen sausage casing wherein the caramel is distributed substantially uniformly throughout the casing and wherein the caramel is present in an amount of from 1 to 10 percent by weight based on the total casing weight and wherein the caramel and collagen are interreacted to form a strongly bound complex from which the caramel is not detached from the collagen when the casing is subjected to subsequent cooking.

2. The edible sausage casing of claim 1 wherein the collagen is present as cohered collagen fibrils.

3. The edible sausage casing of claim 1 wherein the casing also contains cellulose.

4. The edible sausage casing of claim 1 in a shirred form.

5. The edible sausage casing of claim 1 which contains from 4 to 8 percent by weight, based on the total casing weight, of caramel and which is uncured.

6. The edible sausage casing of claim 1 which contains from 1 to 3 percent by weight, based on the total casing weight, of caramel and which is heat cured.

7. A smoked sausage comprising an edible caramel-containing collagen sausage casing, wherein the caramel is distributed substantially uniformly throughout the casing and wherein the caramel is present in an amount of from 1 to 10 percent by weight of the total casing weight and wherein the caramel and collagen are interreacted to form a strongly bound complex from which the caramel is not detached from the collagen when the casing is subjected to subsequent cooking said casing being filled with an edible meat product.

8. The smoked sausage of claim 7 comprising an edible extruded collagen casing of cohered collagen fibrils.

9. The smoked sausage of claim 8 wherein the casing contains from 4 to 8 percent by weight of caramel, based on the total casing weight, and the casing is uncured.

10. The smoked sausage of claim 8 wherein the casing contains from 1 to 3 percent by weight of caramel, based on the total casing weight, and the casing is heat cured.

* * * * *